United States Patent Office 2,881,052
Patented Apr. 7, 1959

2,881,052

PRODUCTION OF CHLORINE DIOXIDE

Arlie P. Julien and Stuart M. Rogers, Syracuse, N.Y., assignors to Allied Chemical Corporation, a corporation of New York Application June 8, 1953, Serial No. 360,391

15 Claims. (Cl. 23—152)

This invention relates to a process for the continuous production of chlorine dioxide by the action of a reducing agent on an aqueous chlorate solution acidified with sulfuric acid. It relates more particularly to improvements in such process whereby the continuous generation of chlorine dioxide can be effected at a substantially uniform rate and other advantages can be obtained.

It is known that chlorine dioxide can be produced by reacting sodium chlorate with a reducing agent in an aqueous reaction mixture acidified with sulfuric acid. It also has been proposed heretofore to generate chlorine dioxide in a continuous manner by passing a stream of air charged with sulfur dioxide countercurrent to a flowing stream of sodium chlorate solution or by continuously passing a stream of air charged with a reducing agent (sulfur dioxide) through a series of bodies of sodium chlorate solution strongly acidified with sulfuric acid (PB 33218, FIAT Report No. 825, May 20, 1946).

Such procedures have the objections that the generation of chlorine dioxide is carried out under disadvantageous conditions and the process is not flexible.

The reaction between a reducing agent and a strongly acidic aqueous chlorate solution obtained by acidifying aqueous sodium chlorate with sulfuric acid does not proceed at a uniform rate. After a short initial period, the rate at which chlorine dioxide is formed rises rapidly and then gradually falls. It is much more rapid when the concentration of chlorate is relatively high than when relatively low. The above known procedures react the reducing agent in highest concentration with a solution containing the chlorate in lowest concentration and vice versa, with the result that the chlorine dioxide is not generated under the most advantageous conditions. Further, in such procedures, the flowing stream of air containing the reducing agent carries with it, in its flow through the chlorate solution, the chlorine dioxide generated by the reaction. As a consequence, the chlorine dioxide is subjected to attack by the components of the chlorate solution, which increases in concentration in the direction of flow of the air stream. Moreover, the concentration of chlorine dioxide in the air stream increases in the direction of flow of the air stream, which tends to have a repressing effect upon the further generation of chlorine dioxide.

The present invention embodies a plurality of features whereby the generation of chlorine dioxide at a substantially uniform rate can be obtained, which rate may be preselected and readily changed to conform to required conditions of use of the chlorine dioxide.

The invention accordingly comprises the steps and relation of one or more of them with respect to others of them which are exemplified in the process hereinafter disclosed. The scope of the invention is indicated in the patent claims.

According to one feature of the present invention, the reduction of the strongly acidic aqueous chlorate solution is carried out in a plurality of stages, and the reaction conditions of the individual stages are correlated with respect to the concentration of $ClO_3$ present.

Further, in accordance with the present invention, the reduction is preferably effected by establishing a flowing stream of aqueous sodium chlorate acidified with an excess of sulfuric acid, introducing methanol and air (jointly or separately) into said stream at a plurality of points along the line of flow of said stream, withdrawing the resulting gas mixtures containing chlorine dioxide from each of said points, and maintaining a temperature gradient between said points which rises in the direction of flow of said stream.

We have found that, by carrying out the reaction in this manner, the generation of chlorine dioxide at a substantially uniform rate can be secured, the disadvantages of prior procedures can be overcome, and additional advantages can be obtained. Thus, we have discovered, if a strongly acidic aqueous chlorate solution obtained by acidifying an aqueous solution of sodium chlorate with sulfuric acid is caused to flow through a plurality of reactors, methanol in limited amounts is added to each reactor as reducing agent, a separate stream of air is passed in contact with the flowing stream of chlorate solution in each of the reactors, and the reaction conditions (e.g., the reaction temperatures in the individual reactors) are correlated with respect to the concentration of $ClO_3$ in the chlorate solutions in the respective reactors, being more vigorous in a later stage than in a prior stage, the generation of chlorine dioxide at a substantially uniform rate can be secured. Since the chlorine dioxide formed in one reactor is removed therefrom by the air stream leaving the reactor and is not passed in contact with the chlorate solutions in the other reactors, the chlorine dioxide is not subjected to attack by the constituents of such other chlorate solutions. Moreover, by dividing the reaction into a plurality of stages, it is possible to carry out the reaction of an individual stage under the conditions preferred for operation of that stage, as determined by the concentration of $ClO_3$ in the chlorate solution of said stage.

The number of stages into which the reduction is divided will depend upon a number of factors; such as the operating conditions of the individual stages and the relation of the cost of equipment to the degree of efficiency desired and overall benefits secured. Thus, satisfactory operation without high equipment cost can be had by carrying out the reduction in two stages; but, for maximum efficiency of operation, it is preferred to employ at least three stages for the reduction of a strongly acidic aqueous chlorate solution resulting from the acidification of aqueous sodium chlorate with sulfuric acid, especially when methanol is employed as the reducing agent. Methanol has the advantages of being a liquid which vaporizes at a relatively low temperature and of reacting readily with chloric acid to give chlorine dioxide, the reaction between methanol and sodium chlorate in the presence of excess sulfuric acid being essentially according to the following theoretical equations:

$$2NaClO_3 + 2H_2SO_4 \rightarrow 2HClO_3 + 2NaHSO_4$$
$$2HClO_3 + CH_3OH \rightarrow 2ClO_2 + HCHO + 2H_2O$$

which equations simplify to the following basic equation:

$$2NaClO_3 + 2H_2SO_4 + CH_3OH \rightarrow$$
$$2ClO_2 + 2NaHSO_4 + HCHO + 2H_2O$$

Throughout the further description and in the claims, the latter basic equation will be referred to in setting out proportions of reactants, since it provides a convenient point of reference having a relatively high degree of correspondence between observed data and theory. It is to be noted however that the invention is not limited to any particular theoretical reactions or other theoretical explanations of the phenomena which occur in the process.

According to a further feature of the present invention, the reduction of chlorate to chlorine dioxide is advantageously carried out in a reaction medium which is a strongly acidic aqueous chlorate solution containing, per 100 parts by weight of solution, 3 to 9 parts, and preferably 5 to 7 parts, of $ClO_3$ and 10 to 50 parts, and preferably 30 to 35 parts, of $SO_4$, and which has been obtained by subjecting a solution of sodium chlorate acidified with excess sulfuric acid to partial reduction. We have discovered that the efficiency of generation of chlorine dioxide by reduction of chlorate with methanol is high in such a reaction medium. Thus, we have discovered that rapid generation of chlorine dioxide can be secured by forming such a reaction medium and adding to it strongly acidic aqueous chlorate solution and methanol in substantially the amounts required by the above equation, while removing partially reduced chlorate solution. We have further discovered that by correlating the addition of the acidic aqueous chlorate solution and of methanol and the removal of partially reduced chlorate solution, equilibrium conditions can be readily established and continuous generation of chlorine dioxide at a relatively uniform rate can be secured.

When methanol is introduced into a strongly acidic aqueous chlorate solution resulting from the acidification of aqueous sodium chlorate with sulfuric acid, chlorine dioxide is formed at a rate which is not constant but which rises rapidly to a maximum and then gradually falls. By employing a partially reduced chlorate solution as the reaction medium for the reduction of chlorate by methanol, it is possible to secure efficient generation of chlorine dioxide at a relatively uniform rate. Then, by reducing remaining chlorate in the partially reduced reaction mixture, under more favorable conditions, as by separately carrying out the further reduction with additional methanol under more elevated temperature conditions, the further reduction can be carried out more efficiently.

One outstanding advantage of this feature of the invention is the flexibility which it gives to the process. In accordance with the present invention, after equilibrium conditions are established, it is possible, within the limits of a particular reactor, to change the output of chlorine dioxide from a given reactor merely by changing the rate of charge of chlorate solution and methanol. Further, by varying the amount of sodium chlorate charged to the system within a given period of time and correspondingly varying the amount of sulfuric acid and methanol charged to the system, it is also possible to vary the rate of production of chlorine dioxide and consequently of chlorine dioxide solution. Thus, the rate of generation of chlorine dioxide or chlorine dioxide solution can be adjusted within relatively wide limits without substantial alteration of the process or equipment required.

This is of particular advantage when chlorine dioxide is used as a bleaching agent, for example, in connection with the bleaching of paper pulp. It makes unnecessary the storage of chlorine dioxide or chlorine dioxide water or the conversion of chlorine dioxide to chlorites or other compounds for storage purposes. In the case of chlorine dioxide water, a distinct economic advantage is secured; since otherwise large storage installations are required, due to the low solubility of chlorine dioxide in water at partial pressures which are considered safe. At ordinary temperature, only about 6 grams of chlorine dioxide per liter of solution is dissolved by water when the chlorine dioxide partial pressure above the solution is about 0.1 atmosphere. In accordance with the present invention, satisfactory bleaching can be had merely by operating the process of the invention at the rate required to generate the chlorine dioxide needed for the bleaching operation.

According to another feature of the present invention, the amount of methanol employed, at least for the first stage of the reduction and preferably for all stages except the last, is a fraction of that theoretically required by the above equation for reaction with the total quantity of chlorate present.

Thus, in one of its specific aspects, the invention embodies a procedure wherein a strongly acidic aqueous chlorate solution, resulting from the acidification of aqueous sodium chlorate with sulfuric acid, is partially reduced to chlorine dioxide by reaction with a limited amount of methanol in a reaction medium consisting of a strongly accidic aqueous chlorate solution containing, per 100 parts by weight of solution, 3 to 9 parts of $ClO_3$, and 10 to 50 parts of $SO_4$, and which has been produced by reduction of a sulfuric acid-acidified aqueous sodium chlorate solution with methanol, for example, by contacting methanol vapor with said reaction medium in the form of a thin film; and effecting further reduction of the chlorate remaining in the resulting partially reduced strongly acidic aqueous chlorate solution by reaction with additional methanol, preferably in a similar reaction medium containing, per 100 parts by weight of solution, 0.2 to 2 parts of $ClO_3$ and 10 to 50 parts of $SO_4$, at a more elevated temperature.

In the practice of the present invention in accordance with the preferred procedure, sodium chlorate is dissolved in water to form an aqueous sodium chlorate solution and the resulting solution is mixed with dilute sulfuric acid. The amount and concentration of the sulfuric acid solution is so proportioned to the amount and concentration of sodium chlorate solution as to provide a mixture which advantageously contains 10 to 25 parts, and preferably about 15 parts, of $ClO_3$ per 100 parts by weight of a solution which is strongly acid and which preferably contains a weight ratio of $ClO_3$ to $SO_4$ of about 1:2. The resulting strongly acidic aqueous chlorate solution is partially reduced by passing it in contact with a stream of air containing methanol vapor, while maintaining the desired reaction temperature, until the concentration of $ClO_3$ in the solution is decreased to about 3 to 9 parts, and preferably between 5 and 7 parts, per 100 parts by weight of solution. For simplicity of operation, the reaction is preferably carried out in a packed tower through which the chlorate solution passes downward in the form of a thin film counter-current to an air stream which is preheated to about 30° to 40° C. and carries methanol vapor in an amount which is a fraction of the stoichiometric amount required for reaction with the total chlorate according to the above formula. The chlorate solution is preferably maintained at a temperature of 20° to 60° C., and more advantageously 40° to 50° C., by withdrawing the solution after its passage through the tower, cooling it to the extent that may be necessary, and returning it to the tower for recirculation. For efficient operation, temperatures near the upper limit are preferred, but safe temperatures should not be exceeded.

The methanol reacts with the aqueous chlorate solution to form chlorine dioxide which is removed with the exit gases. To insure complete reaction of the methanol and efficient generation of chlorine dioxide, the weight of methanol employed relative to the weight of $ClO_3$ in the total chlorate solution recirculated through the tower is only a fraction of the stoichiometric amount required by the above equation. The amount of air employed is controlled so that the concentration of chlorine dioxide in the exit gases is maintained within safe limits, e.g. not exceeding 10% by volume (the partial pressure of $ClO_2$ does not exceed 76 mm.), and preferably is 7.9% to 9.2% by volume (a partial pressure of $ClO_2$ of 60 mm. to 70 mm.).

When the concentration of $ClO_3$ in the solution has decreased to about 3 to 9 parts per 100 parts by weight of solution, the partially reduced chlorate solution is recirculated as reaction medium for additional chlorate. A portion of the chlorate solution is bled from the recirculating stream and is replaced by addition of strongly acidic aqueous chlorate solution obtained by acidifying aqueous sodium chlorate with excess sulfuric acid and preferably containing the above weight ratio of $ClO_3$ to $SO_4$. The specific $ClO_3$ concentration and rate of feed of the strongly acidic chlorate solution employed for this purpose will depend upon the desired rate of evolution of chlorine dioxide; and the rate of methanol feed will be correlated thereto, being preferably a weight ratio of methanol to $ClO_3$ of 1:5 to 1:20, per unit of time.

The partially reduced chlorate solution withdrawn from the primary reactor is introduced into a similar secondary reactor where it is brought into contact with a mixture of air and methanol vapor. The charge in the secondary reactor, similarly to the charge in the primary reactor, is preferably recirculated through a packed tower and is maintained at the desired temperature by an external temperature-regulating means. Owing to the lower concentration of $ClO_3$ in the secondary reactor, the secondary reactor is operated at a somewhat higher temperature than the primary reactor; for example, 40° to 65° C., preferably 50° to 60° C. (temperatures near the upper limit being preferred). The weight ratio of methanol to $ClO_3$ is a fraction of the stoichiometric amount required by the above equation, similarly to the primary reactor.

The chlorate solution in the secondary reactor is further reduced in this manner, the concentration of $ClO_3$ decreasing to about 0.2 to 2 parts per 100 parts by weight of solution. A portion of it is bled off into a third reactor when employed, and the rest is recirculated as reaction medium for the bleed from the primary reactor.

The third reactor is similar to the other two. It serves as a clean-up for substantially completing the reduction of the chlorate remaining in the solution. The residual aqueous acid chlorate solution is also preferably recirculated in the clean-up reactor in the form of a thin layer of liquid in countercurrent contact with an air-methanol mixture until reduction of the chlorate is substantially complete. Preferably the amount of methanol employed relative to the amount of $ClO_3$ in the clean-up reactor is substantially the stoichiometric amount required by the above equation. Owing to the greater dilution of the chlorate in the clean-up reactor, the solution recirculating therein is maintained at somewhat higher temperature than in the secondary reactor, for example, 60° to 80° C. and preferably 70° C., by suitable heating if necessary.

A portion of the substantially exhausted solution is bled from the clean-up reactor, in an amount proportioned to the amount supplied to it as bleed-off from the secondary reactor, and the remainder is recirculated as reaction medium for the clean-up reaction. In this way, the volume of liquid circulated in the series of reactors is maintained substantially constant.

If it is desired to simplify the equipment and operation, the methanol can be charged to the reactors, in liquid or vapor form, separately from the air feed; for example, by introducing liquid methanol or methanol vapor into the air streams in the towers, or by adding liquid methanol to the withdrawn solutions prior to their return to the towers. Transfer of inflammable methanol vapor-air mixtures may be avoided in this manner.

The exhausted liquor contains a substantial amount of sodium acid sulfate ($NaHSO_4$) and if desired this may be recovered in the known manner.

The chlorine dioxide generated in the reactors is carried out of the reactors by the exit air streams. It is preferably recovered in the form of a solution in water by scrubbing the chlorine dioxide-air mixtures with water in suitable apparatus, such as a scrubbing tower. As in the case of the reactors, towers filled with inert packing material are preferably employed.

In order that the invention may be understood more fully, reference should be had to the following description and the accompanying drawing showing, somewhat schematically, one form of apparatus for carrying out the invention.

Figure 1:
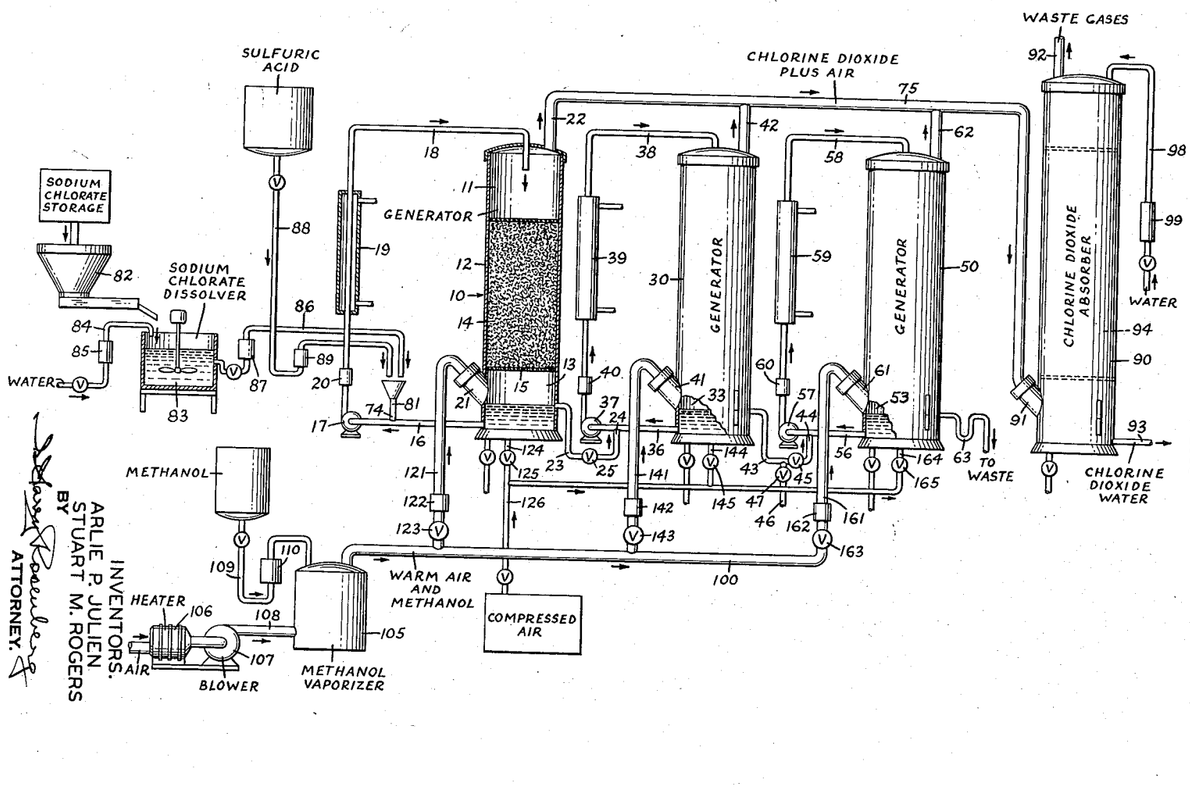

In the drawing numerals 10, 30 and 50 indicate reaction vessels in which a circulating stream of strongly acidic aqueous chlorate solution is reacted with methanol for the generation of chlorine dioxide. Each of reactors 10, 30 and 50 is preferably a vertical scrubbing tower of suitable dimensions (for example about 15 ft. high and 18 inches in diameter) formed of chemical stoneware or other suitable material resistant to the corrosive action of aqueous sulfuric acid and other reaction components and products. As shown in greater detail in connection with reactor 10, the tower is divided into an upper gas chamber 11, a middle packed chamber 12, and a lower chamber 13 which serves as a reservoir for the circulating chlorate solution. The middle chamber 12, which preferably occupies substantially half of the volume of the tower, contains a suitable inert packing material 14 for spreading the solution into a thin film so as to secure intimate contact between the chlorate solution and stream of air. The packing material (for example, ceramic Raschig rings about one inch in size, Berl saddles, or other conventional packing material) rests on a perforated plate 15 or other suitable support.

The reactor 10 is provided with means for circulating and recirculating the aqueous chlorate solution through the tower, so as to maintain the packing material 14 wet with the solution. This is shown in the drawing as a pipe 16 for withdrawing solution from the reservoir 13, a pump 17, and a return pipe 18 which terminates within the chamber 11 above the packing material 14. The pipe 18 is provided with a temperature-regulating jacket 19 supplied with a suitable medium (such as cooling water) for maintaining the recirculating chlorate solution at the desired temperature. Reactor 10 is further provided with a gas inlet 21, which opens into the lower chamber 13 above the level of liquid in the reservoir, and an outlet 22 for the gas mixture formed in the reactor (chlorine dioxide mixed with air and other gases).

Each of reactors 30 and 50 is similar in construction to tower 10 and is similarly provided with means for recirculating chlorate solution through the tower, shown as including off-take pipes 36 and 56, pumps 37 and 57, and return pipes 38 and 58 which are provided with temperature-regulating jackets 39 and 59, respectively, and which terminate within the upper chambers of towers 30 and 50, respectively. Reactor 30 is provided with a gas inlet 41 and a gas outlet 42, and reactor 50 is similarly provided with a gas inlet 61 and a gas outlet 62.

To provide for the flow of partially reduced chlorate solution from reactor 10 to reactor 30 and from reactor 30 to reactor 50, the reservoir 13 of reactor 10 is connected by an overflow pipe 23 with a side inlet 24 of pipe 36, and the reservoir of reactor 30 is similarly connected by an overflow pipe 43 with a side inlet 44 of pipe 56. Pipes 23 and 43 are provided with valves 25 and 45, respectively. A discharge pipe 46 having a valve 47 is also connected to pipe 43 for discharge of reduced solution when operating with only two reactors.

Aqueous sodium chlorate solution and sulfuric acid are introduced into the system through a feed pipe 81, which is connected to a side inlet 74 of pipe 16. Preferably the sodium chlorate solution is produced, as needed, by feeding solid sodium chlorate in measured quantities from a feeder 82 into a sodium chlorate dissolver 83 to which water is supplied by a pipe 84 and from which aqueous sodium chlorate solution is carried by pipe 86 to the supply pipe 81. Sulfuric acid is supplied to the pipe 81 by pipe 88.

A vaporizer 105, for supplying a mixture of warm air and methanol vapor to the reactors 10, 30 and 50 is connected through manifold 100 and pipes 121, 141 and 161, with the respective gas inlets 21, 41 and 61 of the reactors. Air, warmed by heater 106, is supplied to the methanol vaporizer 105 by a blower 107 and pipe 108. Methanol is supplied to the vaporizer by pipe 109. The reactors 10, 30 and 50 are further connected through auxiliary gas inlets 124, 144 and 164, respectively, with pipe 126 which leads to a source of compressed air.

Each of the gas outlets 22, 42 and 62 from the reactors is connected with a gas header 75 for the gas mixtures formed in the reactors. If desired the gas mixture may be conveyed by the header 75 to the point of use of the chlorine dioxide. In the preferred practice of the invention, the gas mixture is passed upward through an absorber, countercurrent to a stream of water, which removes the chlorine dioxide from the gas mixture by absorption and forms a water solution of chlorine dioxide. As shown in the drawing, the chlorine dioxide absorber 90 is a scrubbing tower similar in construction to the towers 10, 30 and 50, but preferably of greater height so as to provide a longer path of contact between the gas and water. The absorber 90 is provided with a gas inlet 91 which is connected to the gas header 75, an outlet 92 for the waste gases, and a discharge pipe 93 for the chlorine dioxide solution formed in the absorber. Water is supplied to the top of the absorber by a pipe 98.

It will be understood by those skilled in the art that the apparatus shown diagrammatically in the drawing embodies additional conventional equipment (not shown) for measuring temperatures, for supplying the temperature-regulating media to the jackets 19, 39 and 59, for regulating and controlling the flow of the liquids and gases, etc. as well as suitable apparatus for measuring the flow of liquids and gases passing through the apparatus, such as flow meters 20, 40, 60, 85, 87, 89, 99, 110, 122, 142 and 162.

In the practice of the invention in connection with the apparatus illustrated in the drawing, an aqueous solution of sodium chlorate is produced by feeding solid sodium chlorate in measured quantities from feeder 82 into the sodium chlorate dissolver 83 while introducing the required amount of water to produce the desired sodium chlorate concentration. In general, sodium chlorate solutions of 32% to 46% by weight are employed. The resulting solution is introduced into the supply pipe 81 together with sulfuric acid from pipe 88. The amount of sulfuric acid is preferably greatly in excess of that required to liberate chloric acid from the sodium chlorate solution. The resulting strongly acidic aqueous chlorate solution is pumped by pump 17 through pipe 18 into the reaction tower 10, where it flows downward over the packing material 14 into the reservoir 13. The strongly acidic aqueous chlorate solution is recirculated through pipe 16, pump 17 and pipe 18 back to the tower 10 at a suitable rate to keep the packing material 14 wet with said solution but without flooding. The feed of chlorate solution and sulfuric acid into pipe 81 is temporarily discontinued when a substantial body of solution has accumulated in the reservoir 13 of reactor 10, but recirculation of the solution through tower 10 is continued.

The dissolution of sodium chlorate in water is an endothermic reaction and the dilution of sulfuric acid and its reaction with sodium chlorate is an exothermic reaction. On mixing the sodium chlorate solution with the sulfuric acid, the cooling effect of the dissolution of the solid sodium chlorate in part counteracts the heating effect of the sulfuric acid on it. The temperature of the recirculating solution is controlled, by suitable regulation of the temperature-regulating medium in jacket 19, so as to maintain the temperature of the solution entering the top of the tower 10 at about 20° to 60° C., and preferably at approximately 50° C.

In the preferred practice of the invention, reactor 10 is charged with strongly acidic aqueous chlorate solution containing, per 100 parts by weight of solution, 10 to 25 parts (preferably about 15 parts) of $ClO_3$ and 10 to 50 parts (preferably about 30 to 35 parts) of $SO_4$, and produced by feeding solid sodium chlorate and water, preferably in proportions of about 1:2 by weight, to dissolver 83, and passing the resulting solution into feed pipe 81 together with sulfuric acid from pipe 88 in suitable excess. The amount of sulfuric acid added relative to the amount of chlorate solution depends upon the concentration of the sulfuric acid used and the amount of water in the sodium chlorate solution. In general, sulfuric acid of 55% to 80% strength is employed in conjunction with aqueous sodium chlorate solutions of the concentrations referred to above. Advantageously, sulfuric acid of 60° Bé. strength (77.7% $H_2SO_4$) is employed, since it is readily available commercially and can be handled in ordinary steel equipment. Thus, suitable strongly acidic aqueous chlorate solutions can be formed by mixing sodium chlorate, water and sulfuric acid in amounts corresponding with 13 to 32 (preferably about 19) parts of sodium chlorate and 10 to 50 (preferably 30 to 35) parts of $H_2SO_4$ per 100 parts by weight of solution.

Warm air containing methanol vapor is introduced into tower 10 from methanol vaporizer 105 through manifold 100 and pipe 121 and is passed upward through the packing material 14 in countercurrent contact with the recirculating chlorate solution. The temperature of the air-methanol mixture entering the reactor is advantageously maintained at 30° to 40° C., and preferably at approximately 35° C., by suitable control of heater 106. Chlorine dioxide is formed in the reactor by the reduction of the chlorate and is carried off by the air stream leaving through exit 22.

It is an advantage of the use of the above type of reactor that air at ordinary blower pressure can be used for the main air supply, since the streams of air flowing through reactors 10, 30 and 50 are contacted with thin films of the chlorate solutions flowing over the surfaces of the packing material in the reactors and do not have to overcome any substantial hydrostatic head.

In order to remove chlorine dioxide which may be carried down into the reservoir 13 by the chlorate solution and which may be generated in the reservoir 13 by reaction of chloric acid with methanol absorbed in the solution, a slow stream of auxiliary air is introduced into the liquid in reservoir 13 through pipe 124, controlled by valve 125.

The amount of air introduced into reactor 10 through pipes 121 and 124 is proportioned to the amount of chlorine dioxide generated in the reactor. In general, a concentration of chlorine dioxide in air greater than about 0.1 atmosphere (a partial pressure of chlorine dioxide of about 76 mm.) is considered unsafe. (Gas pressures are referred to herein in terms of mm. of mercury.) Accordingly, air is preferably passed through reactor 10 in sufficient amount to maintain the partial pressure of chlorine dioxide in the gas mixture leaving through outlet 22 below 76 mm. and preferably at about 60 to 70 mm. or lower.

The amount of liquid methanol introduced into the vaporizer by pipe 109 is controlled so as to supply to the air stream entering reactor 10 an amount of methanol which is only a fraction of that required for reaction, according to the above equation, with the chlorate present. As noted above, it is a feature of the present invention that the recirculating chlorate solution is contacted with a limited amount of methanol, so that effective control of the reaction and of the generation of chlorine dioxide can be obtained.

The solution is recirculated through reactor 10 with cooling to 20° to 60° C., preferably about 50° C., until the chlorate in the recirculating solution has been reduced sufficiently to provide the desired reaction medium for carrying out the reduction of additional chlorate at a high rate.

In the preferred practice of the invention, recirculation of the solution is continued until the chlorate has been reduced to 25% to 50% of its original concentration and the partially reduced chlorate solution contains, per 100 parts by weight of solution, about 3 to 7.5 parts of $ClO_3$ and 10 to 50 parts of $SO_4$. A strongly acidic aqueous chlorate solution of the latter concentration is preferred as a reaction medium for the generation of chlorine dioxide by reaction of methanol with chlorate, inasmuch as it enables the rapid generation of chlorine dioxide to be obtained under conditions which are readily controlled.

When the desired degree of reduction has been attained in reactor 10, the feed of sodium chlorate solution and sulfuric acid to pipe 81 is resumed. Reactor 10 then becomes, in effect, a generator for producing chlorine dioxide at a substantially uniform rate from the acidified chlorate solution introduced into the system through pipe 81 and methanol introduced with the air stream. In the preferred practice of the invention, methanol is introduced into reactor 10 in an amount such that the weight ratio of methanol to $ClO_3$ in the strongly acidic aqueous chlorate solution circulating and recirculating in reactor 10 is 1:5 to 1:20, and preferably about 1:8. The increase in volume of recirculating solution in reactor 10 resulting from the feed of solution through pipe 81 raises the level of liquid in reservoir 13 above overflow pipe 23, so that part of the recirculating chlorate solution is bled over into pipe 36 and reservoir 33, from which it is pumped by pump 37 through pipe 38 into reactor 30. Pump 37 is preferably operated at a suitable rate to keep the surfaces of the packing material in tower 30 wet but without flooding.

When, instead of introducing the methanol into the reactor in the form of vapor in admixture with the air stream it is desired to charge the methanol separately, the warm air is introduced without methanol and methanol, preferably in the amounts referred to above, may be added to the warm air stream in the bottom chamber 13 of the reactor; for example, liquid methanol may be run into gas inlet 21, whereupon part of it is vaporized by the warm air and carried along as a vapor-air mixture and the remainder mixes with the solution in the reservoir and is carried over into the tower 10 with the recirculating solution, or the methanol may be introduced into the warm air stream in the bottom chamber 13 of reactor 10 in the form of a liquid spray or as methanol vapor. Alternatively, the methanol may be added in liquid form to the recirculating chlorate solution; for example, by charging it to supply pipe 81 whereupon it is mixed with the solution by the action of pump 17 and carried on into tower 10 by the recirculating solution.

After a sufficient volume of solution is recirculating in tower 30 to raise the level of liquid in reservoir 33 to a point where a full stream circulates through flowmeter 40, warm air containing methanol vapor is also introduced into reactor 30 from manifold 100 through pipe 141, and is passed upward in countercurrent contact with the recirculating partially reduced chlorate solution and then out through outlet 42, carrying with it chlorine dioxide formed in reactor 30. The temperature is regulated by temperature regulator 39, so as to maintain the recirculating solution entering the tower at 40° to 65° C., preferably about 60° C. As in the case of reactor 10, auxiliary compressed air is introduced into the liquid reservoir through pipe 144, and the volume of air introduced into tower 30 through pipes 141 and 144 is correlated with respect to the quantity of chlorine dioxide formed, so as to maintain the partial pressure of chlorine dioxide leaving through exit 42 below 76 mm. and preferably at about 60 mm. to 70 mm. or lower. Also, as in the case of reactor 10, the amount of methanol introduced into reactor 30 is a fraction of that required for reaction with the existing amount of $ClO_3$, according to the above equation.

When the volume of recirculating chlorate solution in reactor 30 builds up to the point where the level of liquid in the reservoir 33 reaches overflow pipe 43, part of the recirculating chlorate solution is bled over into pipe 56 and reservoir 53, from which it is pumped by pump 57 through pipe 58 into tower 50. Pump 57 is also preferably operated at a suitable rate to keep the surfaces of the packing material in tower 50 wet but without flooding.

When a sufficient volume of solution is circulating in tower 50 to raise the level of liquid in reservoir 53 of said tower to overflow pipe 63, warm air containing methanol vapor is also introduced into the reactor 50 from manifold 100 through pipe 161, and passes upward in countercurrent contact with the recirculating partially reduced chlorate solution and passes out through outlet 62 carrying with it chlorine dioxide formed in the reactor 50. The temperature of the recirculating solution entering reactor 50 is maintained at 60° to 80° C., preferably about 70° C., by suitable control of temperature regulator 59. As in the case of the reactors 10 and 30, auxiliary compressed air is introduced into the liquid reservoir through pipe 164, and the volume of air introduced into reactor 50 through pipes 161 and 164 is correlated with respect to the quantity of chlorine dioxide formed, so as to maintain the partial pressure of chlorine dioxide below 76 mm. and preferably at about 60 mm. to 70 mm. or lower.

Inasmuch as the third reactor 50 serves to complete the reduction of the chloric acid remaining in the solution leaving the reactor 30, methanol in the amount substantially required to react with the remaining chloric acid present in reactor 50, according to the above equation, is introduced into reactor 50.

The exhausted solution overflows from the reactor 50 into pipe 63 and is removed for recovery of sodium acid sulfate or other components, or is discarded.

When the process is operated with only the two reactors 10 and 30, the exhausted solution leaving reactor 30 is removed through pipe 46.

As in the case of reactor 10, when it is desired to charge the methanol separately to reactors 30 and 50 instead of in admixture with the air streams, liquid methanol, preferably in the above amounts, may be introduced into the warm air streams in chambers 33 and 53 of the reactors through inlets 41 and 61 (or sprayed, or introduced as vapor, into the warm air streams in said chambers) or it may be added to the recirculating chlorate solutions; for example, by introducing it into off-take pipes 36 and 56 whereupon it is mixed with the solutions by the action of the pumps 37 and 57 and carried on into reactors 30 and 50 by the recirculating solutions.

If it is desired to employ, in the gas form, the chlorine dioxide produced in this manner and carried off in the air stream passing through header 75, the chlorine dioxide-containing air stream may be directed to the point of use. Ordinarily it is preferable to employ chlorine dioxide, for example in the bleaching of paper pulp or for other purposes, in the form of an aqueous solution. Accordingly, in the preferred practice of the present invention, the chlorine dioxide-containing gas mixture is discharged from conduit 75 into absorber 90 where it passes upward in countercurrent contact with water flowing downward over the surfaces of packing material contained in the absorber. Water is supplied to the absorber at a rate adapted to form an aqueous solution of chlorine dioxide of the concentration desired for use, which is withdrawn through discharge pipe 93.

It will be apparent that after the solution recirculating in reactor 10 has been reduced to the desired chlorate concentration, in the preliminary stages of the process, and the continuous feed of strongly acidic aqueous chlorate solution to the reactor has been established, the reactor becomes in effect a generator whereby chlorate fed into the system through feed pipe 81 is reduced to the concentration level of the recirculating solution in reactor 10 by reaction with methanol introduced into the reactor. Thus, as noted above, the recirculating chlorate solution serves in effect as a reaction medium for the reaction of the added chlorate with the methanol reducing agent.

Partially reduced chlorate solutions having the concentrations of $ClO_3$ set out above are employed as the recirculating reaction medium in reactor 10 in the preferred operation of the process, since it has been found that this permits generation of chlorine dioxide at a satisfactorily rapid rate. The invention is not limited to the use of solutions of such $ClO_3$ concentration, but includes the use of recirculating solutions containing higher or lower $ClO_3$ concentrations.

As noted above, an important feature of the present invention is the flexibility of the process. Since the partially reduced solution recirculating through reactor 10 serves in effect as a reaction medium, the generation of chlorine dioxide at various rates can be secured in a simple manner by varying the rate of charge of sodium chlorate solution and sulfuric acid to feed pipe 81 and correspondingly varying the rate of charge of methanol. It is noted since reduction of the chlorate charged to reactor 10 is carried to substantially the same point under such various conditions (within the limits of the capacity of reactor 10) no substantial variation need occur in the operation of reactors 30 and 50, whose primary function is to complete the reduction of the chlorate remaining in the solution leaving reactor 10. Thus, it is possible to obtain generation of chlorine dioxide at a uniform rate desired for a particular use and, when it is desired to generate chlorine dioxide at a different uniform rate for another use, it is merely necessary to change the rate of charge of methanol, sodium chlorate solution and sulfuric acid to the system. This is of special advantage in connection with the use of chlorine dioxide as a bleaching agent for paper pulp and other cellulosic products, since it makes unnecessary the storage of chlorine dioxide or chlorine dioxide water solutions.

It is also a feature of the present invention that the system for generating chlorine dioxide or chlorine dioxide solution can be shut down and held in stand-by condition merely by shutting off the feed of sodium chlorate solution, sulfuric acid and methanol while continuing the flow of air until the reaction in the towers 10, 30 and 50 has ceased, and then stopping operation of the process and passing a slow stream of air through each of the reactors, to remove any chlorine dioxide which may be formed while the solutions are standing. Thus, small streams of compressed air may be introduced into each of reactors 10, 30 and 50 through auxiliary air inlets 124, 144 and 164. When it is desired to renew operation of the process, it is merely necessary to start the circulation and recirculation of the chlorate solutions through the reactors, start the feed of sodium chlorate solution and sulfuric acid to the first reactor, and start the flow of methanol to each of the reactors. After a short time, equilibrium conditions become reestablished and the generation of chlorine dioxide proceeds at a substantially uniform rate.

As noted above, the present invention involves the use of a plurality of reactors or reduction zones for the generation of chlorine dioxide, at least three being preferred for most efficient operation but two being adequate ordinarily when maximum efficiency is not essential and economy of operation is of primary importance. The following specific Examples 1 to 4 illustrate the invention employing two reactors; the following specific Example 5 illustrates the use of three reactors. Unless indicated otherwise, parts and percentages are by weight.

EXAMPLE 1

Sodium chlorate is dissolved in water and the resulting solution is charged through supply line 86 to feed pipe 81 of the above apparatus, jointly with 60° Bé. sulfuric acid (77.7% $H_2SO_4$) from sulfuric acid supply line 88, in the following proportions:

45 lbs. of sodium chlorate of 99% purity
94.5 lbs. of water
92 lbs. of 60° Bé. sulfuric acid The resulting strongly acidic aqueous chlorate solution, which contains 15.1 parts $ClO_3$ and 31.0 parts $SO_4$ per 100 parts of solution, is charged to and recirculated through reactor 10 as described above. The temperature of the recirculating solution, measured at the entrance of the solution into reactor 10, is maintained at 51° C. by cooling water circulated through temperature regulator 19. A mixture of methanol vapor and air, containing from 4 to 4.5% of methanol, is introduced into reactor 10 at a temperature of approximately 35° C. Formation of chlorine dioxide begins almost immediately and, after reactor 10 is charged with 231.5 lbs. of the solution, as described above, the feed of aqueous chlorate solution and sulfuric acid is temporarily interrupted. Recirculation of the solution is continued, with introduction of the methanol-air mixture in sufficient amount to maintain the partial pressure of chlorine dioxide in the resulting gas mixture below 70 mm., until the concentration of $ClO_3$ is reduced to about 30% of its original concentration. The resulting partially reduced chlorate solution contains, per 100 parts of solution, about 4.5 parts of $ClO_3$ and about 31 parts of $SO_4$. The feed of strongly acidic aqueous chlorate solution (addition of sodium chlorate solution and sulfuric acid to feed pipe 81) is then resumed and the partially reduced chlorate solution is allowed to overflow into reactor 30, where it is recirculated as described above, in contact with air containing methanol, and finally on out through discharge pipe 46. After conditions of equilibrium have been established, the continuous generation of chlorine dioxide at a substantially uniform rate in the manner described above is effected by feeding sodium chlorate and sulfuric acid to reactor 10 at the rates of 900 grams per min. of sodium chlorate solution containing 32.4% sodium chlorate and 622 grams per minute of sulfuric acid of 77.7% strength (resulting in 1522 grams of a solution containing, per 100 parts, 15.1 parts of $ClO_3$ and 31.0 parts of $SO_4$) while maintaining the temperature at 51° C.; passing in the methanol-air mixture (at a temperature of approximately 35° C.) at the rate of 29 grams per min. of methanol, together with 2 cu. ft. per min. of compressed air; bleeding partially reduced chlorate solution (containing 3.6 parts of $ClO_3$ per 100 parts of solution) from reactor 10 to reactor 30 at the rate of about 1520 grams of solution per minute; maintaining the temperature of the chlorate solution in reactor 30 at 61° C. while passing in 7.7 cu. ft. per min. of the methanol-air mixture (at a temperature of approximately 35° C.), together with 2 cu. ft. per min. of compressed air; and discharging resulting reduced chlorate solution from reactor 30 through discharge pipe 46 at the rate of about 1520 grams of solution per minute. After equilibrium conditions have been established, chlorine dioxide is generated at the rate of about 131 grams per min. in reactor 10 and about 37.5 grams per min. in reactor 30, the average partial pressure of chlorine dioxide in the gas mixture leaving reactor 10 being 68 mm., the average partial pressure of chlorine dioxide in the gas mixture leaving reactor 30 being 36 mm., and the average partial pressure of chlorine dioxide in the gas mixture entering absorber 90 being 58 mm. (The gas referred to herein as chlorine dioxide contains 96.3% of chlorine dioxide and 3.7% of chlorine by volume in the case of the gases leaving reactor 10, and about 89% chlorine dioxide and 11% chlorine in the case of the gases leaving reactor 30.) The gases are scrubbed with water at 6° C. in absorber 90, forming an aqueous chlorine dioxide solution containing about 6 grams of chlorine dioxide per liter of solution. The solution discharged from reactor 30 contains about 0.6 gram of $ClO_3$ per 100 grams of solution, or about 3.7% of the chlorate charged to reactor 10.

EXAMPLE 2

The generation of chlorine dioxide is carried out as described above in Example 1, except for the rate of the air feed to reactor 30; the methanol-air mixture (at a temperature of approximately 35° C.) is introduced into reactor 30 through inlet 41 at the rate of about 3 cu. ft. per minute, and auxiliary compressed air is introduced through inlet 144 at the rate of 2 cu. ft. per minute. This change permits obtainment of a gas mixture leaving reactor 30 through gas exit 42 having a partial pressure of chlorine dioxide of about 68 mm. (substantially the same as that leaving reactor 10 through gas exit 22).

The following Examples 3 and 4 illustrate the generation of chlorine dioxide at differing rates by variation of the rates of charge of increments of sodium chlorate solution, sulfuric acid, methanol and air to the first reactor without substantially altering the operation of the remainder of the system.

EXAMPLE 3

A strong acidic aqueous chlorate solution is produced by dissolving sodium chlorate in water and mixing the solution with aqueous sulfuric acid in the following proportions:

45 lbs. of sodium chlorate of 99% purity,
52.5 lbs. of water, and
77 lbs. of 93% sulfuric acid diluted with 55 lbs. of water.

This solution, containing 15 parts of $ClO_3$ and 30.4 parts of $SO_4$ per 100 parts by weight of solution, is charged to feed pipe 81 of the above apparatus and is recirculated through reactor 10 at a temperature of about 46° C. A mixture of methanol vapor and air, containing 1.9% of methanol, is introduced into reactor 10 at a temperature of approximately 35° C. Formation of chlorine dioxide takes place almost immediately and, after reactor 10 is adequately charged with the solution as described above, the feed of strongly acidic aqueous chlorate solution is temporarily interrupted. Recirculation of the solution is continued, with introduction of the methanol-air mixture, until the concentration of $ClO_3$ is reduced to about 37% of its original concentration. The resulting partially reduced chlorate solution contains, per 100 parts of solution, 5.6 parts of $ClO_3$ and 30.4 parts of $SO_4$. The feed of strongly acidic aqueous chlorate solution (addition of sodium chlorate solution and sulfuric acid to feed pipe 81) is then resumed, and the partially reduced chlorate solution is allowed to overflow into reactor 30. After conditions of equilibrium have been established, the continuous generation of chlorine dioxide, at a substantially uniform rate in the manner described above, is effected by feeding strongly acidic aqueous chlorate solution to reactor 10 at the rate set out in the table below and controlling the alcohol and air feeds as set out in said table. The gas referred to as $ClO_2$ in the table contains 95.9% chlorine dioxide and 4.1% chlorine, by volume.

EXAMPLE 4

The strongly acidic aqueous chlorate solution employed in Example 3 is charged to feed pipe 81 of the above apparatus and is recirculated through reactor 10 at a temperature of about 49° C. A mixture of methanol vapor and air, containing 3.8% of methanol, is introduced into reactor 10 at a temperature of approximately 33° C. The process is further operated as in Example 3. In the preliminary reduction stage, the concentration of $ClO_3$ is reduced to about 34% of its original concentration and the resulting partially reduced chlorate solution contains, per 100 parts of solution, 5.1 parts of $ClO_3$ and 30.4 parts of $SO_4$. After conditions of equilibrium have been established, the continuous generation of chlorine dioxide is effected at a substantially uniform rate in the manner described above, by feeding the strongly acidic aqueous chlorate solution to reactor 10 at the rate set out in the table below and controlling the alcohol and air feeds as set out in said table. The gas referred to as $ClO_2$ in the table contains 95.3% chlorine dioxide and 4.7% chlorine, by volume.

Table

|  | Example 3 | Example 4 |
|---|---|---|
| Chlorate solution input (containing 15 parts of $ClO_3$ and 31.4 parts of $SO_4$ per 100 parts of solution)___gm. per min__ | 1,515 | 3,030 |
| $NaClO_3$ input___gm. per min__ | 290 | 580 |
| Air-methanol mixture to reactor 10__cu. ft. per min__ | 38 | 38 |
| Methanol input___gm. per min__ | 28.4 | 56.8 |
| Auxiliary compressed air to reactor 10 cu. ft. per min__ | 2 | 2 |
| Output of $ClO_2$ gas from reactor 10__gm. per min__ | 115 | 244 |
| Partial pressure $ClO_2$ in exit gases from reactor 10___mm__ | 27 | 57 |

It will be noted from a comparison of Example 4 with Example 3 that the output per minute of chlorine dioxide was more than doubled by doubling the rates of charge of acidic chlorate solution and methanol, without substantially altering the other conditions of the reactor.

EXAMPLE 5

Sodium chlorate is dissolved in water and the resulting solution is charged through supply line 86 to feed pipe 81 of the above apparatus, jointly with 60° Bé. sulfuric acid (77.7% $H_2SO_4$) from sulfuric acid supply line 88, in the following proportions:

58.4 lbs. of sodium chlorate of 99% purity
121.9 lbs. of water
128.1 lbs. of 60° Bé. sulfuric acid The resulting strongly acidic aqueous chlorate solution, which contains 14.7 parts of $ClO_3$ and 31.5 parts of $SO_4$ per 100 parts of solution, is pumped into reactor 10. After reactor 10 is charged with about 700 lbs. of the solution, the feed of aqueous chlorate solution and sulfuric acid is temporarily interrupted and the solution circulated downward through the reactor over the packing 14, then through the recirculating system 16, 17 and 18, and again through the reactor 10 while maintaining its temperature at about 51° C. Air at a temperature of approximately 35° C. is introduced into the reactor through the heater 106, blower 107, pipes 100 and 121, and duct 21 (without addition of methanol to the air). Liquid methanol is added to the recirculating solution in pipe 16, through feed pipe 81 or other suitable feed line, or into conduit 121 at a point above inlet 21, and is mixed with the solution by the action of circulating pump 17 and carried over into the reactor with the recirculating solution. The methanol is added at a rate of about 0.4 pound per minute. Formation of chlorine dioxide begins almost immediately. Recirculation of the solution is continued, with further addition of methanol at about said rate, while introducing air in sufficient amount to maintain the partial pressure of chlorine dioxide in the resulting gas mixture leaving the reactor below 70 mm., until the concentration of $ClO_3$ is reduced to about 45% of its original concentration (the resulting partially reduced chlorate solution contains, per 100 parts of solution, about 6.5 parts of $ClO_3$ and about 31.5 parts of $SO_4$). The feed of strongly acidic aqueous chlorate solution (addition of sodium chlorate solution and sulfuric acid to feed pipe 81) is then resumed and recirculation of solution is continued with continued addition of methanol to pipe 16 or conduit 121 and introduction of warm air. Partially reduced chlorate solution is allowed to overflow into pipe 24 from which it is pumped to reactor 30, where it is recirculated as described above, but with similar addition of liquid methanol to pipe 36, or conduit 141 at a point above inlet 41, through a suitable feed line (not shown) while introducing warm air through conduit 141 at a sufficient rate to maintain the chlorine dioxide concentration in the resulting gas mixture leaving the reactor below 70 mm. The rate of methanol charged to pipe 36 corresponds with about 10% of the weight of ClO₃ overflowing into pipe 24. When reactor 30 is adequately charged, the solution collected in reservoir 33 is permitted to overflow into pipe 56, valve 45 being open and valve 47 being closed. The resulting solution is circulated by pump 57 into reactor 50 where it is passed in contact with warm air, which is introduced through conduit 161 at a sufficient rate to maintain the chlorine dioxide concentration in the resulting gas mixture leaving the reactor below 70 mm., and then recirculated as described above. Methanol at a rate corresponding with about 22% of the weight of ClO₃ entering pipe 56 through pipes 43 and 44, is added to the recirculating solution in pipe 56 or to conduit 161 at a point above inlet 61, through a suitable feed line (not shown), and is mixed with the solution by the circulating pump 57 and carried over into the reactor with the solution. Exhausted solution is withdrawn from reactor 50 through overflow pipe 63. The exit gases from the three reactors are scrubbed in absorber 94 with water at about 7° C.

After conditions of equilibrium have been established, the continuous generation of chlorine dioxide at a substantially uniform rate and in amounts of 2.0 to 2.25 tons of ClO₂ per day, as an aqueous solution containing an average of 5.9 grams per liter of ClO₂, is effected in the manner described above by feeding sodium chlorate and sulfuric acid to reactor 10 at the rates of 18 pounds per min. of sodium chlorate solution containing 32% sodium chlorate, and 12.8 pounds per min. of sulfuric acid of 77.7% strength (resulting in 30.8 pounds per minute of a solution containing, per 100 parts, 14.7 parts of ClO₃ and 31.5 parts of SO₄) while maintaining the temperature at 51.2° C.; adding methanol at the rate of 0.37 pound per min. while passing in warm air (at a temperature of approximately 35° C.); bleeding partially reduced chlorate solution (containing about 6.5 parts of ClO₃ per 100 parts of solution) from reactor 10 to reactor 30 at substantially the rate, by volume, of solution feed to reactor 10; maintaining the temperature of the chlorate solution in reactor 30 at 55.7° C. while passing in warm air (at a temperature of approximately 35° C.); bleeding partially reduced chlorate solution (containing 2.9 parts of ClO₃ per 100 parts of solution) from reactor 30 to reactor 50 at substantially the rate, by volume, of solution feed to reactor 30; maintaining the temperature of the chlorate solution in reactor 50 at 52.9° C. while passing in warm air (at a temperature of approximately 35° C.); and discharging resulting substantially exhausted chlorate solution from reactor 50 through discharge pipe 63 at substanitally the same rate by volume as solution feed to reactor 50. The chlorine dioxide product obtained in reactor 10 is 98.2 percent ClO₂ and 1.8 percent Cl₂, that obtained in reactor 30 is 95.5 percent ClO₂ and 4.5 percent Cl₂, and that obtained in reactor 50 contains a higher percentage of Cl₂. The aqueous chlorine dioxide solution formed in absorber 90 contains an average of about 5.9 grams of chlorine dioxide and not more than .35 gram of chlorine, per liter of solution.

While the invention has been described in connection with specific reagents, proportions of reactants, reaction conditions and apparatus, it will be realized by those skilled in the art that the invention is not limited to such detailed description and that changes can be made without departing from the scope of the invention. Thus, instead of sodium chlorate employed in the above description, other chlorates compatible with sulfuric acid may be employed, a number of which are known. While methanol is preferred as the reducing agent, other reducing agents which react with chlorate to form chlorine dioxide in aqueous solutions which have been strongly acidified with sulfuric acid may be employed. Further, other inert gases may be employed instead of air.

In the process described above, the partially reduced chlorate solutions preferably employed as recirculating reaction media for the reduction of the chlorate are formed in place, by a preliminary reduction. While such procedure provides simplicity of operation, it will be evident that said solutions may be prepared in any other manner and then charged to the reactors. Thus, the solutions may be prepared separately by suitable reduction of chlorate solutions; for example, by reacting a strongly acidic aqueous chlorate solution with methanol or other reducing agent under chlorine dioxide-forming conditions until solutions of the desired ClO₃ concentrations are formed.

Further, while partially reduced chlorate solution removed as bleed from one reactor is introduced directly into the following reactor in the process described above, the invention includes intermediate storage of the bleed solution before introduction into a succeeding reactor. Ordinarily, such intermediate storage is not required, since the bottom portion of each reactor functions as an adequate reservoir for the recirculating solution.

Since, in the practice of the invention, changes may be made in the details of the above disclosure and in the process above described without departing from the scope of the invention, it is intended that all matter contained in the above description shall be interpreted as illustrating, and not limiting, the invention, except as limited by the claims.

This application is a continuation-in-part of our application Serial No. 168,486, filed June 16, 1950, and now abandoned.

We claim:

1. In the production of chlorine dioxide from acidified aqueous chlorate solution by means of a reducing agent, the improvement which comprises forming a partially reduced strongly acidic aqueous chlorate solution containing, per 100 parts by weight of solution, 3 to 9 parts of ClO₃ and 10 to 50 parts of SO₄; adding to said solution increments of aqueous chlorate solution and an excess of sulfuric acid; adding to said solution increments of reducing agent, whereby chlorine dioxide is formed, the amount of added reducing agent not exceeding that required to reduce the added ClO₃ in the resulting strongly acidic aqueous chlorate solution to ClO₂; passing a stream of inert gas in contact with the resulting chlorate solution; removing decrements of the resulting partially reduced chlorate solution; and removing resulting chlorine dioxide with the exit gas stream.

2. A process as defined in claim 1 wherein the partially reduced strongly acidic aqueous chlorate solution is formed by reaction of a reducing agent with a chlorate solution resulting from the acidification of aqueous metal chlorate with an excess of sulfuric acid, and the added reducing agent is methanol.

3. A process as defined in claim 1 wherein the increments of chlorate solution and reducing agent are in substantially theoretical proportion relative to each other.

4. In the production of chlorine dioxide from acidified aqueous chlorate solution by means of a reducing agent, the improvement which comprises forming a partially reduced strongly acidic aqueous chlorate solution containing, per 100 parts by weight of solution, 3 to 9 parts of ClO₃ and 10 to 50 parts of SO₄, by reaction of methanol with a chlorate solution resulting from the acidification of aqueous metal chlorate with an excess of sulfuric acid; adding to said solution increments of aqueous chlorate solution and an excess of sulfuric acid; adding to said solution increments of methanol, the weight of added methanol relative to the weight of added chlorate being in the ratio of 1:5 to 1:20, whereby chlorine dioxide is formed and a partially reduced chlorate solution is formed which contains 3 to 9 parts of ClO₃ per 100 parts by weight of said solution; passing a stream of inert gas in contact with the resulting chlorate solution; removing decrements of the resulting partially reduced chlorate solution; and removing resulting chlorine dioxide with the exit gas stream.

5. A process as defined in claim 4 wherein the partially reduced strongly acidic aqueous chlorate solution contains 5 to 7 parts of $ClO_3$ and 30 to 35 parts of $SO_4$, per 100 parts by weight of solution, and the metal chlorate is sodium chlorate.

6. A continuous process for the production of chlorine dioxide which comprises establishing a flow of aqueous chlorate solution acidified with sulfuric acid through a reaction zone, said solution containing in excess of 3 parts of $ClO_3$ per 100 parts by weight of solution, passing a stream of inert gas in contact with the solution in the reaction zone, reacting the solution with methanol in an amount not exceeding that required to decrease the $ClO_3$ concentration to 3 parts per 100 parts by weight of solution, whereby chlorine dioxide is produced in said reaction zone, withdrawing inert gas containing resulting chlorine dioxide from the reaction zone, withdrawing from the reaction zone acidified solution containing at least 3 parts of unreduced $ClO_3$ per 100 parts by weight of solution, returning a part of said withdrawn solution containing unreduced chlorate to the reaction zone for recirculation through said reaction zone, and adding aqueous chlorate solution and sulfuric acid to the solution returned for recirculation.

7. In the production of chlorine dioxide by the reduction of acidified aqueous metal chlorate with methanol the improvement which comprises mixing sodium chlorate, water and sulfuric acid in proportions to form a strongly acidic aqueous chlorate solution containing, per 100 parts by weight of solution, 10 to 25 parts of $ClO_3$ and about twice as much $SO_4$; reacting the solution with methanol under chlorine dioxide-forming conditions until the concentration of $ClO_3$ in the solution is decreased to 3 to 9 parts per 100 parts of solution; adding to the resulting solution aqueous sodium chlorate and sulfuric acid in amounts corresponding to 10 to 25 parts of $ClO_3$ and 10 to 50 parts of $SO_4$, by weight, adding methanol to the reaction mixture in an amount by weight in the ratio of 1:20 to 1:5 of the weight of the added sodium chlorate, maintaining the temperature of the resulting reaction mixture at 20° to 60° C., passing a stream of inert gas through the reaction mixture, and removing resulting chlorine dioxide with the gas stream leaving the reaction mixture.

8. In the production of chlorine dioxide by contacting acidified aqueous metal chlorate with an inert gas charged with a reducing agent, the improvement which comprises forming a strongly acidic aqueous chlorate solution containing, per 100 parts by weight of solution, 10 to 25 parts of $ClO_3$ and about twice as much $SO_4$, by acidification of an aqueous solution of sodium chlorate with sulfuric acid; passing a stream of inert gas charged with a reducing agent in contact with said strongly acidic aqueous chlorate solution under chlorine dioxide-forming conditions until the concentration of $ClO_3$ in the resulting partially reduced solution is decreased to 3 to 9 parts per 100 parts by weight of solution; continuously adding increments of said strongly acidic aqueous chlorate solution to said partially reduced solution while passing an inert gas containing methanol in contact with the resulting solution, whereby chlorine dioxide is formed; continuously removing decrements of the resulting partially reduced chlorate solution; passing a stream of inert gas containing methanol in contact with the partially reduced solution removed as said decrements, at a higher reaction temperature, whereby additional chlorine dioxide is formed; and continuously removing resulting chlorine dioxide with the exit gas streams.

9. A continuous process for the production of chlorine dioxide which comprises mixing sodium chlorate, water and sulfuric acid in proportions to form a strongly acidic aqueous chlorate solution containing, per 100 parts by weight of solution, 10 to 25 parts of $ClO_3$ and about twice as much $SO_4$; reacting the solution with methanol under chlorine dioxide-forming conditions until the concentration of $ClO_3$ in the solution is decreased to 3 to 9 parts per 100 parts of solution; continuously circulating and recirculating the resulting partially reduced chlorate solution through a reactor; maintaining the temperature of the recirculating solution at 20° to 60° C.; adding to the recirculating solution a strongly acidic aqueous chlorate solution resulting from the acidification of metal chlorate with excess sulfuric acid; introducing methanol into said reactor as a reducing agent for the chlorate, whereby chlorine dioxide is formed, the weight of methanol introduced into said reactor in relation to the weight of $ClO_3$ in the added strongly acidic aqueous chlorate solution being in the ratio from 1:5 to 1:20; continuously passing a stream of air, preheated to 30° to 40° C., through said reactor in contact with said recirculating chlorate solution; and continuously removing chlorine dioxide formed in the reactor with the air stream leaving the reactor.

10. A continuous process for the production of chlorine dioxide which comprises mixing sodium chlorate, water and sulfuric acid in proportions to form a strongly acidic aqueous chlorate solution containing, per 100 parts by weight of solution, 10 to 25 parts of $ClO_3$ and 10 to 50 parts of $SO_4$; reacting the solution with methanol under chlorine dioxide-forming conditions until the concentration of $ClO_3$ in the solution is decreased to 3 to 9 parts per 100 parts of solution; continuously circulating and recirculating the resulting partially reduced chlorate solution through a reactor; maintaining the temperature of the recirculating solution at 20° to 60° C.; continuously adding to the recirculating solution a strongly acidic aqueous chlorate solution resulting from the acidification of aqueous sodium chlorate with sulfuric acid and containing, per 100 parts by weight of solution, 10 to 25 parts of $ClO_3$ and 10 to 50 parts of $SO_4$; continuously passing a stream of air, preheated to 30° to 40° C. and containing methanol vapor, through said reactor in contact with said recirculating chlorate solution, whereby chlorine dioxide is formed, the weight of methanol introduced into said reactor in relation to the weight of $ClO_3$ in the added strongly acidic aqueous chlorate solution being in the ratio from 1:5 to 1:20; continuously withdrawing partially reduced chlorate solution from the reactor; continuously circulating and recirculating the resulting partially reduced chlorate solution through another reactor; maintaining the temperature of said recirculating solution at 40° to 65° C.; continuously passing a stream of air, preheated to 30° to 40° C. and containing methanol vapor, through said reactor in contact with said recirculating chlorate solution, whereby additional chlorine dioxide is formed; continuously withdrawing resulting reduced chlorate solution from the second reactor; removing chlorine dioxide formed in said reactors with the air streams leaving the reactors; and controlling the amount of air introduced into said reactors to maintain a maximum partial pressure of chlorine dioxide of 70 mm. in the air streams leaving the reactors.

11. In a continuous process for the production of chlorine dioxide from acidified aqueous chlorate solution by means of a reducing agent, the improvement which comprises establishing a plurality of bodies of partially reduced aqueous solutions of sodium chlorate acidified with excess sulfuric acid, each succeeding body of solution containing a lower concentration of $ClO_3$ than its preceding body in the series; circulating and recirculating each body of solution through a reduction zone in contact with the reducing agent and a stream of inert gas; withdrawing partially reduced solution from a preceding body of solution and introducing it into a succeeding body of the series; continuously adding, as replacement to the first body of solution, a strongly acidic aqueous chlorate solution obtained by acidifying aqueous sodium chlorate with excess sulfuric acid; limiting the amount of reducing agent introduced into at least the first reduction zone to a fraction of the amount required to reduce the chlorate present in said zone to chlorine dioxide; and withdrawing inert gas containing chlorine dioxide from each of the reduction zones.

12. In the production of chlorine dioxide from acidified aqueous chlorate solution, obtained by acidification of aqueous metal chlorate with an excess of sulfuric acid, by reaction with methanol as reducing agent, the improvement which comprises carrying out the reduction in a series of reaction stages in each of which partially reduced acidic chlorate solution, resulting from the reduction of an aqueous chlorate solution containing, per 100 parts by weight of solution, more than 3 parts of $ClO_3$ and 10 to 50 parts of $SO_4$, is flowed downwardly over the packing in a packed column countercurrently to inert gas admitted below the packing in the column, methanol is reacted with the chlorate solution in the column, a portion of the resulting solution collected from the bottom of the column is recirculated back to the top of the column for additional reaction with methanol therein, and another portion of said resulting solution is withdrawn from the column and introduced into a succeeding column in the series; adding to the solution in the first column of said series strongly acidic aqueous chlorate solution containing, per 100 parts by weight of solution, 10 to 25 parts of $ClO_3$ and 10 to 50 parts of $SO_4$, the amount of added solution being substantially the amount required to replace the liquid removed from said first column; limiting the amount of methanol reacted with the chlorate solution in the first column to a fraction of the amount required to reduce all of the chlorate present in said solution to chlorine dioxide; and withdrawing product gas comprising essentially chlorine dioxide and said inert gas from above the packing in each column.

13. A continuous process for the production of chlorine dioxide which comprises establishing a series of at least two bodies of partially reduced strongly acidic aqueous chlorate solutions, obtained by acidifying aqueous sodium chlorate with sulfuric acid and reducing with methanol under chlorine dioxide-forming conditions, the first body of solution containing, per 100 parts by weight of solution, 3 to 9 parts of $ClO_3$ and 10 to 50 parts of $SO_4$, and the second body of solution containing, per 100 parts by weight of solution, 0.2 to 2 parts of $ClO_3$ and 10 to 50 parts of $SO_4$; continuously adding to the first body of solution a strongly acidic aqueous chlorate solution containing, per 100 parts by weight of solution, 10 to 25 parts of $ClO_3$ and 10 to 50 parts of $SO_4$; reacting with the first body of solution, maintained at a temperature of 20° to 60° C., methanol in an amount which is a fraction of the amount required to reduce the chlorate present in said body of solution to chlorine dioxide and not exceeding the amount required to reduce the $ClO_3$ concentration of said body of solution to 3 parts per 100 parts by weight of solution, whereby chlorine dioxide is formed; passing a stream of air in intimate contact with said first body of solution; bleeding reduced chlorate solution from the first body of solution and introducing it into the second body of solution; reacting with the second body of solution, maintained at a temperature of 40° to 65° C., methanol in an amount which is a fraction of the amount required to reduce the chlorate present in said second body of solution to chlorine dioxide, whereby chlorine dioxide is formed; passing a stream of air in intimate contact with said second body of solution; bleeding reduced chlorate solution from the second body of solution; and withdrawing air containing chlorine dioxide from each of said bodies of solution.

14. A continuous process for the production of chlorine dioxide which comprises establishing a first body of partially reduced chlorate solution containing 3 to 7.5 parts of $ClO_3$, per 100 parts of solution, by dissolving sodium chlorate in water and mixing the resulting solution with sulfuric acid of 55% to 80% strength to form a strongly acidic aqueous chlorate solution containing approximately 15 parts of $ClO_3$ and 30 to 35 parts of $SO_4$ per 100 parts of solution, adjusting the temperature of the strongly acidic aqueous chlorate solution to 20° to 60° C. and passing it through a reactor in contact with a stream of methanol-containing air introduced at a temperature of 30° to 40° C., whereby a part of the chlorate is reduced and chlorine dioxide is formed; withdrawing the partially reduced chlorate solution, adjusting its temperature to 40° to 60° C., returning the resulting solution to the reactor for repeated contact with said stream of methanol-containing air, and continuing such recirculation of the partially reduced chlorate solution until said solution contains 3 to 7.5 parts of $ClO_3$ per 100 parts of solution; bleeding a portion of the resulting partially reduced chlorate solution while continuing said recirculation; feeding a strongly acidic aqueous chlorate solution, obtained by acidifying sodium chlorate with excess sulfuric acid, to said first body of partially reduced chlorate solution in amounts substantially equal to the amounts of solution bled therefrom; adjusting the temperature of the bleed to 40° to 65° C. and passing it through a second reactor in contact with a stream of methanol-containing air introduced at a temperature of 30° to 40° C., whereby additional chlorate is reduced and chlorine dioxide is formed; withdrawing resulting reduced chlorate solution, adjusting its temperature to 40° to 60° C., and returning it to said second reactor, together with additional bleed from said body of solution, for repeated contact with said stream of methanol-containing air as a second body of partially reduced chlorate solution; bleeding a portion of the latter chlorate solution while continuing said recirculation; adjusting the temperature of the latter bleed to 60° to 80° C. and passing it through a third reactor in contact with a stream of methanol-containing air introduced at a temperature of 30° to 40° C., whereby additional chlorate is reduced and chlorine dioxide is formed; withdrawing resulting solution; adjusting its temperature to 60° to 80° C., and returning it to said third reactor, together with additional bleed from said second body of solution for repeated contact with said stream of methanol-containing air as a body of reduced chlorate solution; bleeding a portion of the resulting substantially exhausted solution while continuing said recirculation; withdrawing with the exit gases from the reactors the chlorine dioxide formed in said reactors; controlling the amount of methanol introduced into each reactor in relation to the amount of $ClO_3$ in the solution entering said reactor within a given period of time, the weight ratio of methanol to $ClO_3$ introduced into the first reactor being from 1:5 to 1:20; and controlling the amount of air introduced into each reactor to provide an exit gas mixture from each reactor having a maximum partial pressure of chlorine dioxide of 70 mm.

15. A process as defined in claim 12 wherein liquid methanol is added to the reduced chlorate solution recirculated back to the top of each column, the amount of methanol added to the first column being substantially that required to reduce to chlorine dioxide the chlorate present in the strongly acidic aqueous chlorate solution added as replacement to said column.

References Cited in the file of this patent

UNITED STATES PATENTS

| | | |
|---|---|---|
| 2,332,181 | Soule | Oct. 19, 1943 |
| 2,451,826 | Haller | Oct. 19, 1948 |
| 2,510,034 | Haller | May 30, 1950 |
| 2,664,341 | Kesting | Dec. 29, 1953 |

FOREIGN PATENTS

| | | |
|---|---|---|
| 575,173 | Great Britain | Feb. 6, 1946 |
| 675,054 | Great Britain | July 2, 1952 |

UNITED STATES PATENT OFFICE
CERTIFICATE OF CORRECTION

Patent No. 2,881,052            April 7, 1959

Arlie P. Julien et al.

It is hereby certified that error appears in the printed specification of the above numbered patent requiring correction and that the said Letters Patent should read as corrected below.

Column 20, line 30, for "40° to 60° C." read -- 40° to 65° C. --.

Signed and sealed this 4th day of August 1959.

(SEAL)

Attest:
KARL H. AXLINE
Attesting Officer

ROBERT C. WATSON
Commissioner of Patents